(12) United States Patent
Ochiai

(10) Patent No.: US 11,794,511 B2
(45) Date of Patent: Oct. 24, 2023

(54) INDUCTOR CORE, ELECTRONIC PEN, AND INPUT DEVICE

(71) Applicant: KYOCERA Corporation, Kyoto (JP)

(72) Inventor: Hitomi Ochiai, Omihachiman (JP)

(73) Assignee: KYOCERA Corporation

( * ) Notice: Subject to any disclaimer, the term of this patent is extended or adjusted under 35 U.S.C. 154(b) by 28 days.

(21) Appl. No.: 17/764,961

(22) PCT Filed: Sep. 28, 2020

(86) PCT No.: PCT/JP2020/036603
§ 371 (c)(1),
(2) Date: Mar. 29, 2022

(87) PCT Pub. No.: WO2021/065790
PCT Pub. Date: Apr. 8, 2021

(65) Prior Publication Data
US 2022/0363087 A1    Nov. 17, 2022

(30) Foreign Application Priority Data

Sep. 30, 2019  (JP) ................................ 2019-179681

(51) Int. Cl.
*B43K 29/00* (2006.01)
*B43K 21/00* (2006.01)
(Continued)

(52) U.S. Cl.
CPC ............ *B43K 29/00* (2013.01); *B43K 21/006* (2013.01); *G06F 3/03545* (2013.01); *H01F 1/344* (2013.01); *H01F 27/255* (2013.01)

(58) Field of Classification Search
CPC ...... G06F 3/03545; G06F 3/046; G06F 3/041; H01F 1/344; H01F 27/255; H01F 1/342; H01F 27/24; B43K 29/00; B43K 21/006
(Continued)

(56) References Cited

U.S. PATENT DOCUMENTS

2021/0011564 A1   1/2021  Ochiai
2022/0413639 A1 * 12/2022  Watanabe ............. G06F 3/0442

FOREIGN PATENT DOCUMENTS

JP    2018-041429 A    3/2018
WO   2019/189938 A1   3/2019

* cited by examiner

*Primary Examiner* — David J Walczak
(74) *Attorney, Agent, or Firm* — PROCOPIO CORY HARGREAVES AND SAVITCH LLP

(57) ABSTRACT

An inductor core includes a magnetic main body having a pillar shape and comprised of a magnetic material. The magnetic main body includes an inclined portion including an inclined surface that constitutes an outer circumferential surface of a truncated cone having an outer diameter increasing from one end toward the other end; and a straight body portion that is coaxial with the inclined portion and includes an outer peripheral surface that constitutes an outer circumferential surface of a cylindrical column body extending from the other end toward the one end, the straight body portion being connected to the inclined portion. An arithmetic mean roughness Ra of an outer peripheral surface of the straight body portion located at or around the other end is smaller than an arithmetic mean roughness Ra of an outer peripheral surface of the straight body portion that is disposed at or around the inclined portion.

20 Claims, 5 Drawing Sheets

(A)

(B)

(51) Int. Cl.
*G06F 3/0354* (2013.01)
*H01F 1/34* (2006.01)
*H01F 27/255* (2006.01)

(58) Field of Classification Search
USPC .................................................. 401/258–260
See application file for complete search history.

(A)

(B)

(A)

(B)

INDUCTOR CORE, ELECTRONIC PEN, AND INPUT DEVICE

TECHNICAL FIELD

The present invention relates to an inductor core, an electronic pen, and an input device.

BACKGROUND ART

There is an input device that detects positions on a tablet, a display, or the like provided with a position detection sensor for inputting position information into a personal computer (PC), a smartphone, or the like. In this input device, an electronic pen is used to give instruction of a position on the position detection sensor.

As such an electronic pen, Patent Document 1 proposes a digitizer writing unit including a writing unit configured to write a drawing line on a paper surface, a ferrite core having an outer periphery provided with an electromagnetic induction coil, and a pressure sensor configured to sense pressure applied to the writing unit, each of which is housed in a shaft tube. In the digitizer writing tool described in Patent Document 1, the tip portion of the shaft tube is formed into a tapered shape of which the outer diameter gradually decreases, and a tip end includes an opening portion from which the writing unit protrudes. The ferrite core is formed separately from the writing unit, and is disposed parallel to the writing unit within the shaft tube.

CITATION LIST

Patent Literature

Patent Document 1: JP 2018-41429 A

SUMMARY

Technical Problem

A cover wire such as a litz wire, a USTC wire (polyurethane-tetoron single-strand copper wire), or a urethane wire is wound around a magnetic body core such as a ferrite core to form a coil. In particular, coil tension tends to be high at a winding-starting side where the coil comes into contact with the magnetic body core, and thus, there is a possibility that the coil breaks or a cover portion of the coil is damaged depending on the state of the front surface of the outer peripheral surface.

Solution to Problem

An inductor core according to the present disclosure includes a magnetic main body having a pillar shape and comprised of a magnetic material. The magnetic main body includes: an inclined portion including an inclined surface that constitutes an outer circumferential surface of a truncated cone having an outer diameter increasing from one end of the magnetic main body toward the other end; and a straight body portion that is coaxial with the inclined portion and includes an outer peripheral surface that constitutes an outer circumferential surface of a cylindrical column body extending from the other end toward the one end, the straight body portion being connected to the inclined portion. An arithmetic mean roughness Ra of an outer peripheral surface of the straight body portion located at or around the other end is smaller than an arithmetic mean roughness Ra of an outer peripheral surface of the straight body portion located at or around the inclined portion.

An electronic pen according to the present disclosure includes a housing including an opening, a writing unit that can be used to write on a target writing surface, and the inductor core described above. The writing unit is disposed along a central axis of the housing, and the inductor core is disposed alongside the writing unit within the housing.

An input device according to the present disclosure includes the electronic pen, and a position detection device including a sensor configured to detect a position at which the electronic pen approaches.

Advantageous Effects of Invention

With the inductor core according to the present disclosure, the arithmetic mean roughness Ra at a portion where the coil of the inductor core is wound is small. This makes the coil less likely to be damaged, which makes it possible to provide an inductor core having high reliability.

The electronic pen according to the present disclosure includes the inductor core having high reliability. This makes it possible to provide an electronic pen that exhibits high reliability.

The input device according to the present disclosure includes the electronic pen that exhibits high reliability. This makes it possible to provide an input device that exhibits high reliability.

DESCRIPTION OF EMBODIMENTS

Figure 1:
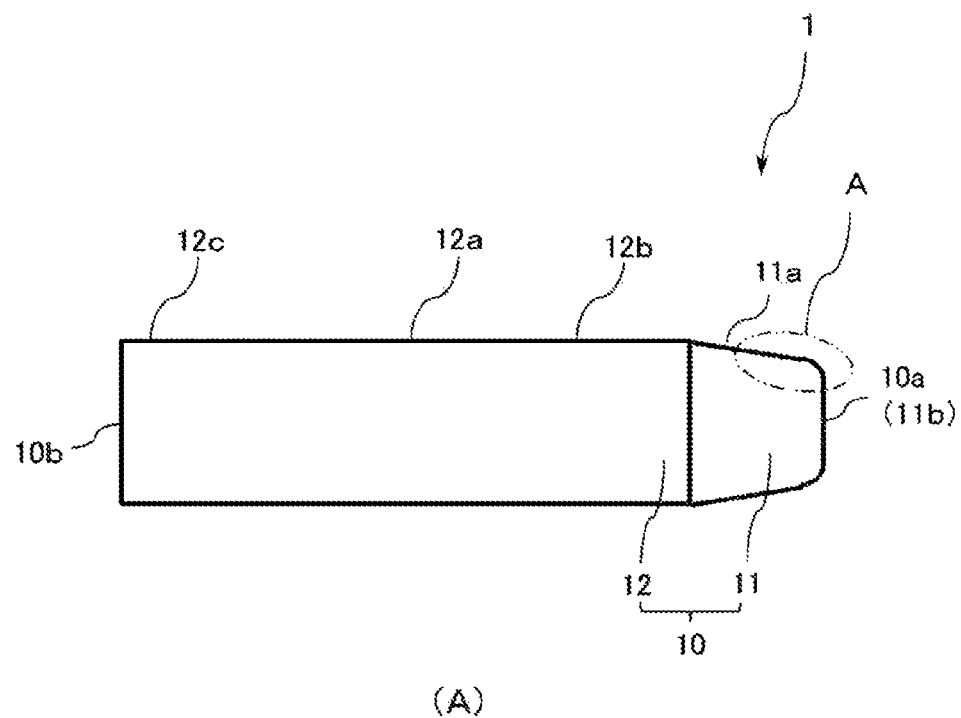
FIG. 1 is a diagram illustrating a first embodiment of an inductor core according to the present disclosure, where (A) is a plan view, and (B) is a cross-sectional view in which the portion A in (A) is enlarged.
Figure 1:
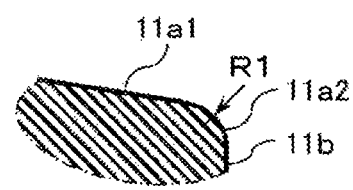

FIG. 1 illustrates a first embodiment of an inductor core according to the present disclosure. FIG. 1(A) is a plan view. FIG. 1(B) is a cross-sectional view in which the portion A in FIG. 1(A) is enlarged. An inductor core 1 is configured with a magnetic main body 10 comprised of a magnetic material such as a ferrite sintered compact.

The magnetic main body 10 includes an inclined portion 11 including an inclined surface 11*a* that constitutes an outer circumferential surface of a truncated cone having an outer diameter increasing from the one end 10*a* toward the other end 10*b*, and also includes a straight body portion 12 that is coaxial with the inclined portion 11 and includes an outer peripheral surface 12*a* of a column body extending from the other end 10b toward the one end 10a, the straight body portion 12 being connected to the inclined portion 11.

The length from the one end 10a of the magnetic main body 10 to the other end 10b is in a range of from approximately 5 mm to 50 mm. The straight body portion 12 has a length of from approximately 3 mm to 12 mm. The straight body portion 12 has an outer diameter of from approximately 2.0 mm to 3.0 mm. The inclined portion 11 has a length of from approximately 0.5 mm to 2.0 mm. The outer diameter of the inclined portion 11 at the one end 10a side is from approximately 1 mm to 2 mm. The outer diameter of the inclined portion 11 at a side opposite from the one end 10a is substantially the same as the outer diameter of the straight body portion 12. In this manner, the inclined portion 11 has a tapered shape having a size that decreases toward the one end 10a.

In the cross-section taken along the central axis of the magnetic main body 10, the outer diameter of the inclined portion 11 increases from the one end 10a toward the other end 10b. That is, the inclined portion 11 has a tapered shape having a size that decreases toward the one end 10a. The inclined surface 11a may include an inclined surface 11a1 that is a portion having a straight-line shape as illustrated in FIG. 1(B), and an inclined surface 11a2 having a round shape. The inclined surface 11a1 may constitute the outer circumferential surface of the truncated cone. The inclined surface 11a at or around the one end 10a may be a curved surface having a convex shape. In other words, the inclined surface 11a1 of the inclined portion 11 and an end surface 11b of the inclined portion 11 may be connected at the inclined surface 11a2 that is a portion of the inclined surface 11a and is a curved surface having a convex shape.

In this manner, the inclined surface 11a1 and the end surface 11b are connected at the inclined surface 11a2 that is a curved surface having a convex shape. This makes it possible to reduce the possibility of breakage in a case where, for example, the end surface 11b of the inclined portion 11 is brought into contact with the housing of the electronic pen. As illustrated in FIG. 1(B), in a cross section taken along the central axis of the magnetic main body 10, R1 falls within a range of approximately 0.1 mm to 0.2 mm, where R1 is a radius of curvature of the inclined surface 11a2 where the inclined surface 11a1 of the inclined portion 11 and the end surface 11b of the inclined portion 11 are connected.

Figure 2:
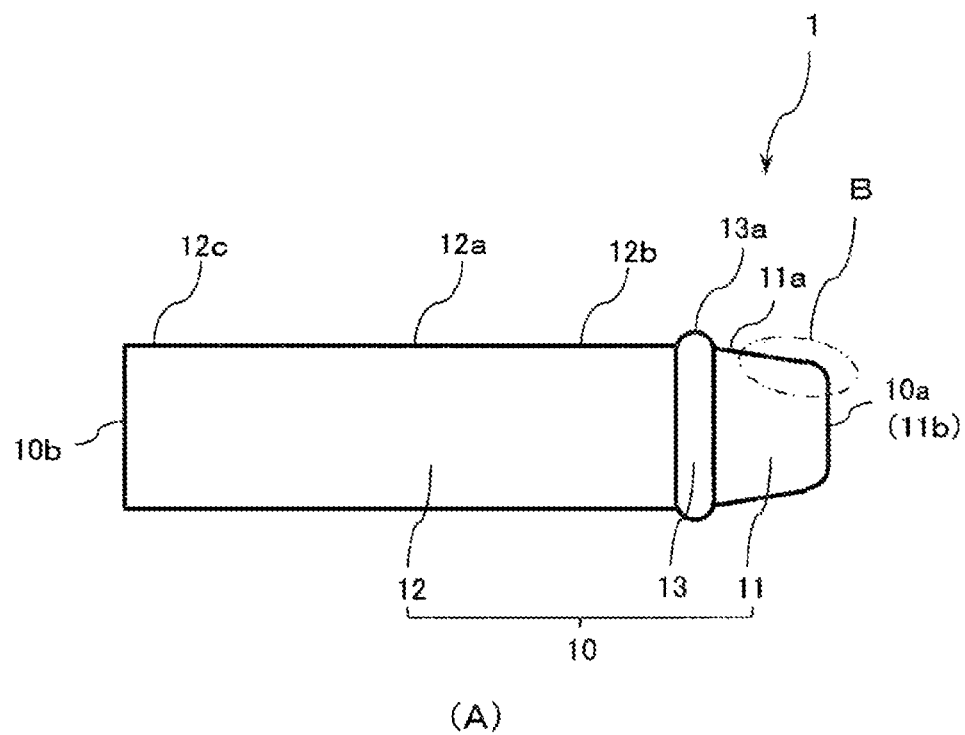
FIG. 2 is a diagram illustrating a second embodiment of the inductor core according to the present disclosure, where (A) is a plan view, and (B) is a cross-sectional view in which the portion B in (A) is enlarged.
Figure 2:
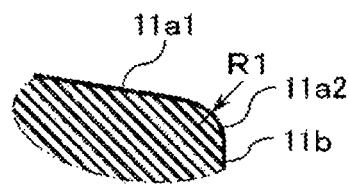

FIG. 2 illustrates a second embodiment of the inductor core according to the present disclosure. FIG. 2(A) is a plan view. FIG. 2(B) is a cross-sectional view in which the portion B in FIG. 2(A) is enlarged. There is a difference from the inductor core 1 according to the first embodiment in that the straight body portion 12 and the inclined portion 11 are connected to each other via a flange portion 13. The magnetic main body 10 includes the inclined portion 11 including the inclined surface 11a that constitutes an outer circumferential surface of a truncated cone having an outer diameter increasing from the one end 10a toward the other end 10b, the straight body portion 12 that is coaxial with the inclined portion 11 and includes the outer peripheral surface 12a of a cylindrical column body extending from the other end 10b toward the one end 10a, and the flange portion 13 disposed between the inclined portion 11 and the straight body portion 12 and connecting the inclined portion 11 and the straight body portion 12. The inclined portion 11, the flange portion 13, and the straight body portion 12 are arranged in this order from the one end 10a toward the other end 10b. The outer peripheral surface 13a of the flange portion 13 has an outer diameter larger than each of the outer diameter of the inclined surface 11a of the inclined portion 11 and the outer diameter of the outer peripheral surface 12a of the straight body portion 12.

For example, in a case where the outer diameter of the straight body portion 12 except for the flange portion 13 falls within a range of from 2.1 mm to 2.5 mm, the maximum value of the outer diameter of the outer peripheral surface 13a of the flange portion 13 falls within a range of from 2.12 mm to 2.72 mm. The flange portion 13 protrudes from the outer peripheral surface 12a of the straight body portion 12 by a maximum of from 0.02 mm to 0.22 mm. By providing the flange portion 13, the straight body portion 12 is less likely to be deformed. This makes it possible to reduce deformation of the straight body portion 12 even in a case where force acts on the inclined portion 11 to deform the inclined portion 11. As illustrated in FIG. 2(B), in a cross section taken along the central axis of the magnetic main body 10, the radius of curvature R1 of the inclined surface 11a2 falls, for example, within a range of from 0.1 mm to 0.2 mm.

The arithmetic mean roughness Ra of the outer peripheral surface 12c of the straight body portion 12 located at or around the other end 10b is smaller than the arithmetic mean roughness Ra of the outer peripheral surface 12b of the straight body portion 12 located at or around the inclined portion 11. Thus, in a case where a cover wire such as a litz wire is wound around the outer peripheral surface 12c of the straight body portion 12 located at or around the other end 10b to form a coil (not illustrated), tension of the coil tends to be high at this portion. However, it is possible to reduce the possibility of breakage of the coil or damage to the cover portion of the coil. By setting the arithmetic mean roughness Ra of the outer peripheral surface 12b located at or around the inclined portion 11 to be greater than that of the outer peripheral surface 12c located at or around the other end 10b, it is possible to obtain a high anchor effect. This makes the coil less likely to be displaced from the position where the coil is originally wound even in a case where the number of times the electronic pen writes increases, which makes malfunction less likely to occur.

A root mean square roughness Rq of the outer peripheral surface 12c of the straight body portion 12 located at or around the other end 10b is smaller than the root mean square roughness Rq of the outer peripheral surface 12b of the straight body portion 12 located at or around the inclined portion 11. This makes it possible to reduce the possibility of breakage of the coil or damage to a cover portion of the coil in a case where a cover wire such as a litz wire is wound at the outer peripheral surface 12c of the straight body portion 12 located at or around the other end 10b to form the coil.

The section height difference (Rδc) of the outer peripheral surface 12c of the straight body portion 12 located at or around the other end 10b is smaller than the section height difference (Rδc) of the outer peripheral surface 12b of the straight body portion 12 located at or around the inclined portion 11. This makes it possible to reduce the possibility of breakage of the coil or damage to the cover portion of the coil in a case where the cover wire such as a litz wire is wound at the outer peripheral surface 12c of the straight body portion 12 located at or around the other end 10b to form the coil.

The section height differences (Rδc) of the outer peripheral surfaces 12c, 12b represent a difference between the section height at a material ratio of 25% in the roughness curve of a target outer peripheral surface and the section height at a material ratio of 75% in the roughness curve of the target outer peripheral surface.

Table 1 shows measurement results of the surface texture of the magnetic main body 10 that constitutes the inductor core 1 according to the present disclosure described above. The arithmetic mean roughness Ra of the roughness curve, the root mean square roughness Rq, and the section height difference (Rδc) were measured in accordance with JIS B 0601:2001 using a laser microscope (manufactured by Keyence Corp., ultra-depth color 3D shape measuring microscope (VK-9500)). The measurement conditions were set such that: the multiplication factor was 200× magnification (eyepiece lens: 20×, objective lens: 10×); the measurement mode was color super-depth; the measurement resolution (pitch) in the height direction was 0.05 μm; the optical zoom was 1.0 time; the gain was 953; the observation range was 1315 μm×982 μm; the cutoff value λs was 2.5 μm; and the cutoff value λc was 0.08 mm.

In the observation range, a range in which focus is achieved (for example, 815 μm to 1315 μm×425 μm to 625 μm) was selected as the measurement range. At the time of calculating the numerical values, the number of samples was 8. The arithmetic mean roughness Ra, the root mean square roughness Rq of the roughness curve, and the section height difference (Rδc) were measured for each portion of the outer peripheral surface. The average values of these parameters were calculated, and were written in Table 1.

TABLE 1

| Portion | Ra (μm) | Rq (μm) | Rδc (μm) |
|---|---|---|---|
| Inclined surface of inclined portion | 6.86 | 11.69 | 7.23 |
| Outer peripheral surface of straight body portion (at or around inclined portion) | 4.95 | 8.44 | 5.36 |
| Outer peripheral surface of straight body portion (at or around other end) | 3.75 | 6.17 | 4.5 |

As shown in Table 1, the arithmetic mean roughness Ra was 6.86 μm at the inclined surface 11a of the inclined portion 11. The outer peripheral surface 12b of the straight body portion 12 located at or around the inclined portion 11 was 4.95 μm. The outer peripheral surface 12c of the straight body portion 12 located at or around the other end 10b was 3.75 μm. In this manner, the arithmetic mean roughness Ra of the outer peripheral surface 12c of the straight body portion 12 located at or around the other end 10b is smaller than the arithmetic mean roughness Ra of the outer peripheral surface 12b of the straight body portion 12 located at or around the inclined portion 11.

The root mean square roughness Rq was 11.69 μm at the inclined surface 11a of the inclined portion 11. The outer peripheral surface 12b of the straight body portion 12 located at or around the inclined portion 11 was 8.44 μm. The outer peripheral surface 12c of the straight body portion 12 located at or around the other end 10b was 6.17 μm. In this manner, the root mean square roughness Rq at the outer peripheral surface 12c of the straight body portion 12 located at or around the other end is smaller than the root mean square roughness Rq at the outer peripheral surface 12b of the straight body portion 12 located at or around the inclined portion 11.

By setting the arithmetic mean roughness Ra of the outer peripheral surface 12b of the straight body portion 12 located at or around the inclined portion 11 to be not more than 6 μm, the arithmetic mean roughness Ra of the outer peripheral surface 12c located at or around the other end 10b where the coil is wound is further reduced. This makes it possible to reduce the possibility of breakage of the coil or damage to the cover portion of the coil in a case where a cover wire such as a litz wire is wound at the outer peripheral surface 12c of the straight body portion 12 located at or around the other end 10b to form the coil.

By setting the root mean square roughness Rq of the outer peripheral surface 12b of the straight body portion 12 located at or around the inclined portion 11 to be equal to or less than 10 μm, the arithmetic mean roughness is further reduced at the outer peripheral surface 12c, around which the coil is wound, located at or around the other end 10b. This makes it possible to reduce the possibility of breakage of the coil or damage to the cover portion of the coil in a case where the cover wire such as a litz wire is wound at the outer peripheral surface 12c of the straight body portion 12 located at or around the other end 10b to form the coil.

The magnetic main body 10 is made of a ceramic having, as the main constituent, ferrite comprised of an oxide of Fe, Zn, Ni, and Cu, and a coefficient of variation CV of the average crystal grain size of the ceramic expressed as Equation 1 below may be not less than 0.08 and not more than 0.3.

$$CV = \sigma/x \quad (1),$$

where x is the average value of average crystal grain sizes of the ceramic, and σ is the standard deviation of average crystal grain sizes of the ceramic.

The main constituent represents a constituent that accounts for not less than 95 mass % of all the constituents of the ceramic, and in particular, not less than 99 mass % is preferable.

The constituent that constitutes the ceramic can be identified from measurement results by an X-ray diffractometer using a CuKα beam. The content of each of the metal components of Fe, Ni, Zn, and Cu can be determined, for example, with an inductively coupled plasma (ICP) emission spectrophotometer or a fluorescence X-ray spectrometer, and it is only necessary to convert the content in terms of oxide.

In a case where the coefficient of variation CV is not less than 0.08, the grain size of crystal particles appropriately varies, and small crystal particles are disposed between large crystal particles. This makes it possible to increase the fracture toughness. In a case where the coefficient of variation CV is not more than 0.3, the percentage of crystal particles having large grain sizes relative to the standard deviation increases, which results in an increase in magnetic permeability. In a case where the coefficient of variation CV is not less than 0.08 and not more than 0.3, it is possible to achieve both high fracture toughness and high magnetic permeability. In particular, it is preferable that the coefficient of variation CV is not less than 0.1 and not more than 0.2.

The average crystal grain size can be determined in the following manner. First, the fracture surface of the inductor core 1 is polished with a copper disk using diamond abrasive grains having an average grain size $D_{50}$ of 3 μm. Thereafter, diamond abrasive particles with an average grain size $D_{50}$ of 0.5 μm are used for polishing with a tin grinder. The polished surface obtained through the polishing described above is etched at a temperature of 950° C. until the crystal particles and the grain boundary layer can be identified from each other, so that an observation surface is obtained.

Within a range of 155 μm×115 μm of the observation surface at 5000× magnification using a scanning electron microscope, six straight lines of the same length of 100 μm, for example, are drawn in a radial manner around a given point. The number of crystals existing on these six straight lines are divided by the individual straight lines, so that the average crystal grain size can be obtained.

Figure 3:
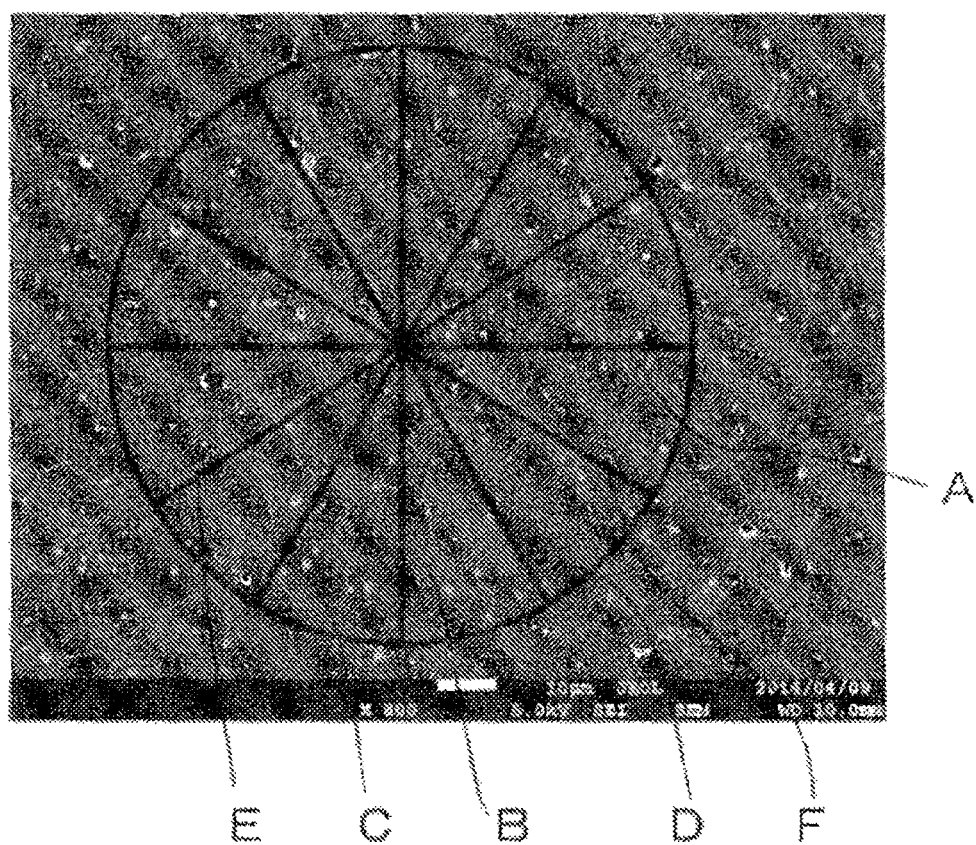
FIG. 3 is a photograph showing an example of an observation surface of the inductor core and the way in which straight lines are drawn.

FIG. 3 is a photograph showing an example of an observation surface of the inductor core and the way in which the straight lines are drawn. It is only necessary to calculate the average value, the standard deviation, and the coefficient of variation CV of the average crystal grain sizes by selecting seven screens of such an observation surface and setting 42 pieces of average crystal grain sizes as targets.

The kurtosis Ku of the average crystal grain size may be not less than 0. In a case where the kurtosis Ku of the average crystal grain size falls within this range, variation in the particle size of crystal particles is suppressed. Thus, aggregation of pores is reduced, and plucking-out generated from the contours or interiors of the pores can be reduced. In particular, it is preferable that the kurtosis Ku of the average crystal grain size is equal to or more than 1.

The kurtosis Ku represents an index (statistical amount) indicating to what extent the peak and tails of a distribution differ from those of normal distribution. If the kurtosis Ku is greater than 0, a distribution with a sharp peak is obtained. If the kurtosis Ku is equal to 0, the distribution becomes a normal distribution. If the kurtosis Ku is less than 0, the distribution becomes a distribution with a rounded peak. It is only necessary that the kurtosis Ku of the average crystal grain size be obtained using the function KURT available in Excel (trade name, available from Microsoft Corporation).

A skewness Sk of the average crystal grain size may be not less than 0. In a case where the skewness Sk of the average crystal grain size falls within this range, the distribution of grain sizes of crystal particles is shifted toward the direction of small grain size. Thus, aggregation of pores is reduced, and plucking-out generated from the contours or interiors of the pores can be further reduced.

The skewness Sk is an index (statistic) indicating a degree by which a distribution is distorted from a normal distribution, that is, the right-left symmetry of the distribution. If skewness Sk>0, a tail of the distribution extends toward the right side. If skewness Sk=0, the distribution is bilaterally symmetrical. If skewness Sk<0, the tail of the distribution extends toward the left side. It is only necessary that the skewness Sk of the average crystal grain size be obtained using the function SKEW available in Excel (trade name, available from Microsoft Corporation).

Of compositions in 100 mol % obtained by adding up the main constituents, it is preferable that the inductor core according to the present disclosure includes Fe of not less than 49 mol % and not more than 50 mol % on a $Fe_2O_3$ basis, Zn of not less than 29 mol % and not more than 34 mol % on a ZnO basis, Ni of not less than 10 mol % and not more than 12.5 mol % on a NiO basis, and Cu of not less than 4 mol % and not more than 9 mol % on a CuO basis.

In a case of the inductor core used in an electronic pen, the magnetic permeability, the specific resistance (electric resistance), and the Curie temperature are all required to be high. In a case where Fe is not less than 49 mol % on a $Fe_2O_3$ basis, the magnetic permeability increases, and in a case where Fe is not more than 50 mol %, the specific resistance increases. In a case where Zn is not less than 29 mol % on a ZnO basis, the magnetic permeability increases, and in a case where Zn is not more than 34 mol %, the Curie temperature increases. In a case where Ni is not less than 10 mol % on a NiO basis, the Curie temperature increases, and in a case where Ni is not more than 12.5 mol %, the magnetic permeability increases. In a case where Cu is not less than 4 mol % on a CuO basis, the magnetic permeability increases, and in a case where Cu is not more than 9 mol %, the magnetic permeability increases.

In the inductor core used in an electronic pen, in a case where Fe, Zn, Ni, and Cu fall within the ranges described above, it is possible to set the magnetic permeability to be equal to or more than 2000, the specific resistance to be equal to or more than $10^9$ Ω·m, and the Curie temperature to be equal to or more than 90° C., which enables the inductor core to be favorably used. In particular, it is preferable that a ratio (value in mol % on a ZnO basis/value in mol % on a NiO basis) between a value of Ni in mol % on an NiO basis and a value of Zn in mol % on a ZnO basis falls within a range of from 2.85 to 3.15.

It is preferable that the inductor core includes at least any of an oxide of Mo and an oxide of Bi, the content of the oxide of Mo with respect to 100 parts by mass of the main constituent is not less than 0.01 parts by mass and not more than 0.2 parts by mass on a $MoO_3$ basis, and the content of the oxide of Bi is not less than 0.01 parts by mass and not more than 0.2 parts by mass on a $Bi_2O_3$ basis. An oxide of Mo and an oxide of Bi promote grain growth of a main crystal. In addition, by setting the contents of the oxide of Mo and the oxide of Bi to fall within the ranges described above, it is possible to increase the magnetic permeability almost without the Curie temperature being decreased. In particular, it is preferable that the content of the oxide of Mo is not less than 0.05 parts by mass and not more than 0.1 parts by mass on a $MoO_3$ basis, and the content of the oxide of Bi is not less than 0.05 parts by mass and not more than 0.1 parts by mass on a $Bi_2O_3$ basis.

It is preferable that the inductor core includes at least any of an oxide of Mn and an oxide of Ti, the content of the oxide of Mn with respect to 100 parts by mass of the main constituent is not less than 0.01 parts by mass and not more than 0.3 parts by mass on a $MnO_2$ basis, and the content of the oxide of Ti is not less than 0.01 parts by mass and not more than 0.2 parts by mass on a $TiO_2$ basis. Mn and Ti can take a plurality of atomic values. Thus, at the time of firing, oxygen deficiency of a ferrite crystal serving as the main crystal is filled with excess oxygen resulting from a change in valences. This makes it possible to reduce the oxygen deficiency of the ferrite crystal and increase the magnetic permeability.

It is preferable that the inductor core includes an oxide of Zr, and the content of the oxide of Zr with respect to 100 parts by mass of the main constituent is not less than 0.01 parts by mass and not more than 0.2 parts by mass on a $ZrO_2$ basis. By setting the content of the oxide of Zr to fall within the range described above, it is possible to increase the specific resistance almost without the magnetic permeability being reduced. In particular, it is preferable that the content of the oxide of Zr is not less than 0.02 parts by mass and not more than 0.11 parts by mass on a $ZrO_2$ basis.

It is preferable that the inductor core includes an oxide of Cr, and the content of the oxide of Cr with respect to 100 parts by mass of the main constituent is not less than 0.02 parts by mass and not more than 0.3 parts by mass on a $Cr_2O_3$ basis. By setting the content of the oxide of Cr to be not less than 0.02 parts by mass, it is possible to promote sintering of ceramic and also increase a saturation magnetic flux density Bs of the inductor core. By setting the content of the oxide of Cr to be not more than 0.3 parts by mass, it is possible to suppress a magnetic loss Pcv and abnormal grain growth that may occur during sintering of ceramic.

It is only necessary that metal elements other than the main constituent are measured using an inductively coupled plasma (ICP) emission spectrophotometer or a glow discharge mass spectrometer device (GDMS), and are each converted on a basis of oxide thereof.

It is preferable that, in at least a portion of a ferrite crystal, the content of Fe at the center portion of the ferrite crystal is greater than the content of Fe at the outer edge portion of the ferrite crystal. This configuration makes it possible to provide high magnetic permeability while maintaining the Curie temperature. This is thought to be because this results from the fact that a large amount of divalent Fe exists in the center portion, which weakens an anisotropic magnetic field; and trivalent Fe exists at the outer edge portion, which makes hopping conduction less likely to occur and makes the resistance less likely to decrease.

The outer edge portion represents a region extending from the interface of a ferrite crystal observed at a surface (hereinafter, this surface is also referred to as an "observation surface") obtained by polishing the inductor core to a mirror finish and then performing thermal etching, to the length of 20% of a major axis. The major axis represents a length in the longest direction of a grain (ferrite crystal) as stated in JIS R 1670: 2006. The center portion means a region extending from the center of the major axis of a ferrite crystal toward the interface to the length of 20% of the major axis.

At the time of selecting a ferrite crystal from the observation surface, a ferrite crystal having a size of from $D_{40}$ to $D_{60}$ is selected, where the average crystal grain size calculated at the observation surface is $D_{50}$.

The content of Fe in the ferrite crystal represents a content of Fe when the content of each spot is 100 mass %, the spot being a spot (φ1 nm) targeted at each of the center portion and the outer edge portion using an energy dispersive X-ray spectrometer (EDS).

It is preferable that a difference between the content of Fe at the center portion and the content of Fe at the outer edge portion is not less than 1.3 mass % and not more than 4.0 mass %. Such a configuration makes it possible to provide further higher magnetic permeability while maintaining the Curie temperature. The reason for this is thought to result from the fact that divalent Fe and trivalent Fe exist at the center portion of the ferrite crystal and the outer edge portion in an optimum proportion.

It is preferable that $I_2/I_1$ is not less than 0.29 and not more than 0.38, where $I_1$ is an X-ray diffraction peak intensity at a diffraction angle (2θ) falling within a range of not less than 35° and not more than 36° and obtained through X-ray diffraction using the Cu-Kα line, and $I_2$ is an X-ray diffraction peak intensity at a diffraction angle (2θ) falling within a range of not less than 29.5° and not more than 30.5°. Such a configuration makes it possible to increase the Curie temperature while maintaining high magnetic permeability.

It is preferable that the half width of the X-ray diffraction peak intensity $I_1$ is not less than 0.05 and not more than 0.35. With such a configuration, it is possible to cause a ferrite crystal to grow while preventing the amorphous grain boundary layer from excessively increasing. This makes it possible to improve mechanical characteristics without reducing the magnetic permeability. In an obtained diffraction chart, the half width represents a value of half of the width between diffraction peaks at a half strength of the maximum value of the X-ray diffraction peak intensity at a diffraction angle (2θ) falling within a range of not less than 35° and not more than 36°.

It is preferable to set $I_3/I_1$ to be equal to or less than 0.14, where $I_3$ is an X-ray diffraction peak intensity at a diffraction angle (2θ) falling within a range of not less than 42° and not more than 43°. Such a configuration makes it possible to improve mechanical characteristics, which makes it possible to reduce the occurrence of chipping even if burrs are removed through barrel finishing or the like after sintering. This reduces damage due to stress occurring at the time of fixing or handling when a wire is wound or an electrode is attached.

At least the inclined portion 11 may include Mo, and the grain boundary layer may contain more Mo than that contained in grains of a ferrite crystal. In a case where the grain boundary layer interposed between adjacent ferrite crystals contains more Mo than that contained in grains of a ferrite crystal, the bonding force between ferrite crystal grains is suppressed. This makes it possible to easily obtain the inclined surface 11a2 having a large radius of curvature R1. To determine the content of Mo in grains of a ferrite crystal and in the grain boundary layer, it is only necessary to perform elementary analysis using a transmission electron microscope and an energy-dispersive X-ray spectrometer (EDS) in association with this transmission electron microscope.

The magnetic main body 10 used in the inductor core 1 can be manufactured in the following manner. First, as starting materials, oxides of Fe, Zn, Ni and Cu, or metal salts such as carbonates and nitrates for producing oxides by firing are prepared. At this time, the average grain size thereof is not less than 0.5 μm and not more than 5 μm when Fe is iron oxide ($Fe_2O_3$), Zn is zinc oxide (ZnO), Ni is nickel oxide (NiO) and Cu is copper oxide (CuO), for example.

Of compositions in 100 mol % obtained by adding up the main constituents, in a case of obtaining the inductor core including Fe of not less than 49 mol % and not more than 50 mol % on a $Fe_2O_3$ basis, Zn of not less than 29 mol % and not more than 34 mol % on a ZnO basis, Ni of not less than 10 mol % and not more than 12.5 mol % on a NiO basis, and Cu of not less than 4 mol % and not more than 9 mol % on a CuO basis, the Fe source powder, the Zn source powder, the Ni source powder, and the Cu source powder are set to fall within the ranges described above.

Below, description will be made of, as an example, a case where the Fe source powder, the Zn source powder, the Ni source powder, and the Cu source powder are all an oxide powder.

At the time of making a first raw material comprised of calcined powder of $Fe_2O_3$—ZnO—NiO and a second raw material comprised of calcined powder of $Fe_2O_3$—CuO, iron oxide, zinc oxide and nickel oxide are weighed to a desired amount for the first raw material. For the second raw material, iron oxide and copper oxide are weighed to a desired amount. Here, the added amount of iron oxide at the time of making the first raw material and the second raw material is set such that the added amount of iron oxide at the time of making the second raw material is set, for example, to the same mol % as that of the copper oxide and the residual amount is used to make the first raw material.

Subsequently, powders that have been weighed to be used for the first raw material and the second raw material are ground and are mixed with one another using separate ball mills, vibrating mills, or the like. Then, the first raw material is made by performing calcination in a reducing atmosphere at 750° C. for not less than 2 hours. The second raw material is made by performing calcination in a reducing atmosphere at 650° C. for not less than 2 hours. Through these procedures, calcined bodies are obtained.

Next, the calcined bodies to be the first raw material and the second raw material are put into separate ball mills or vibrating mills, and are ground to obtain the first raw material comprised of the calcined powder and the second raw material comprised of the calcined powder. At this time, in particular, the calcined body to be the second raw material is ground so that the average grain size $D_{50}$ is equal to or less than 0.7 μm. The first raw material and the second raw material are each weighed to a desired amount, and are mixed. The mixture is calcined again in the atmosphere under conditions of not less than 600° C. and not more than 700° C. at a temperature elevation rate of 100° C./hour or less, to obtain a calcined body comprised of oxide of Fe, Zn, Ni, and Cu and synthesized with ferrite.

Next, the calcined body obtained through calcination is put into a ball mill, a vibrating mill, or the like, and is ground. Then, a predetermined amount of binder or the like is added to obtain a slurry. The thus obtained slurry is sprayed using a spray drier to obtain granulation, and spherical granules are obtained.

The calcined body obtained through calcination is ground until the average grain size $D_{50}$ is equal to or less than 0.7 μm, whereby $I_3/I_1$ can be equal to or less than 0.14. In order to reduce the average grain size $D_{50}$, the grinding time needs to be longer. If grinding is performed for a long period of time, contamination of particles released from the ball used in grinding is highly likely to occur. Thus, it is preferable to set the lower limit value of the average grain size $D_{50}$ to 0.5 μM.

In order to make the inductor core contain oxides of Mo, Bi, Mn, Ti, Zr, Cr, or the like, it is only necessary to add, for example, powder of molybdenum oxide ($MoO_3$), bismuth oxide ($Bi_2O_3$), manganese oxide ($MnO_2$), titanium oxide ($TiO_2$), zirconium oxide ($ZrO_2$), chromium oxide ($Cr_2O_3$), or the like at the time of grinding after calcination.

In a case of obtaining the inductor core 1 in which at least the inclined portion 11 contains Mo, and the grain boundary layer interposed between adjacent ferrite crystals contains more Mo than that contained in grains of a ferrite crystal, powder of molybdenum oxide ($MoO_3$) is added, for example, by not less than 0.01 parts by mass and not more than 0.03 parts by mass with respect to 100 parts by mass of powder obtained by grinding the calcined body obtained through calcination, and a slurry is obtained. It is only necessary that the thus obtained slurry be sprayed to obtain granulation and thus obtain spherical granules.

By using the obtained spherical granules to perform press molding, a powder compact having a predetermined shape is obtained. At the time of this press molding, the surface texture of the mold is adjusted. In addition, adjustment is performed such that more pressure is applied to the straight body portion 12 side than to the inclined portion 11 side. In this manner, it is possible to configure the inclined surface 11a and the outer peripheral surface 12a such that the arithmetic mean roughness Ra and the root mean square roughness Rq decrease from the one end 10a of the magnetic main body 10 toward the other end 10b.

Thereafter, a degreasing process is performed on the powder compact in a degreasing furnace in a range of 400 to 800° C. to obtain a degreased body. Then, the degreased body is fired in a firing furnace at a maximum temperature of 1000 to 1200° C. for two to five hours to form the magnetic main body 10. This makes it possible to obtain the inductor core 1 according to the present embodiment.

In order to obtain an inductor core in which the half width of the X-ray diffraction peak intensity $I_1$ at a diffraction angle (2θ) falling within a range of not less than 35° and not more than 36° is not less than 0.05 and not more than 0.35, it is preferable to set the temperature elevation rate to be not less than 100° C./hour and not more than 300° C./hour during firing.

In order to obtain an inductor core in which $I_2/I_1$ is not less than 0.29 and not more than 0.38, it is preferable that the temperature decrease rate from the maximum temperature to 600° C. is set to fall within a range of 500° C./hour to 1200° C./hour.

The inductor core in which the content of Fe at the center portion of a ferrite crystal is greater than the content of Fe at the outer edge portion of the ferrite crystal can be obtained in the following manner. That is, of starting raw materials, powders of zinc oxide, nickel oxide, and copper oxide are each weighed to within the ranges described above, and are mixed. Then, the powder after mixing is divided into two equal parts.

Powder of iron oxide with 25 mol % and powder of iron oxide with 24.5 mol % are added to the two equally divided powders, respectively, and these are ground and are mixed using a ball mill, vibrating mill, or the like. Here, the side to which 25 mol % is added is regarded as a third mixed powder, and the side to which 24.5 mol % is added is regarded as a fourth mixed powder. Next, in the atmosphere, calcination is performed at a temperature that falls within a range of from 700° C. to 1000° C. to obtain a third calcined body obtained by calcining the third mixed powder and a fourth calcined body obtained by calcining the fourth mixed powder.

Thereafter, the third calcined body together with water is placed into a ball mill or the like to be ground and mixed. The fourth calcined body together with water is also placed into another ball mill or the like to be ground and mixed. At this time, the fourth calcined body is ground and mixed for a longer period of time than the third calcined body is ground and mixed, thereby reducing the grain size thereof. After these bodies are combined, the predetermined amount of binder or the like is added to obtain a slurry. Next, this slurry is sprayed by using a spray drier to obtain granulation, and spherical granules are obtained. Thereafter, the manufacturing method until the inductor core 1 is obtained is the same as the manufacturing method described above.

The magnetic main body 10 that constitutes the inductor core 1 according to the first and second embodiments is formed by press molding. This eliminates the need of performing processes such as cutting, which makes it possible to reduce costs. If post-processes such as cutting are performed, the front surface deteriorates due to the post-processes, and this may deteriorate the characteristics of the inductor core. However, in a case of the inductor core 1 according to the present disclosure, no process is performed after firing, and no deterioration of the front surface occurs. This makes it possible to form the inductor core 1 having high reliability.

Figure 4:
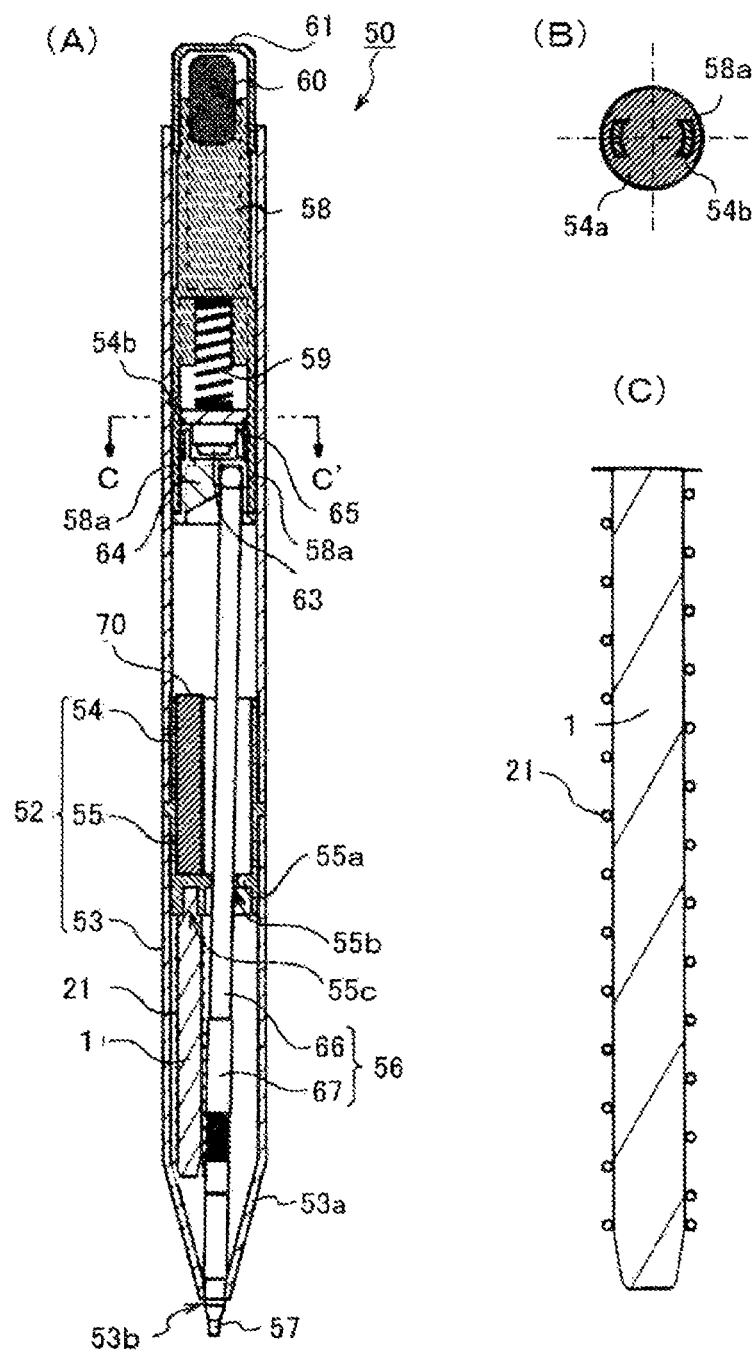
FIG. 4 is a diagram illustrating an embodiment of an electronic pen according to the present disclosure, where (A) is a cross-sectional view taken along the direction of the central axis, (B) is a cross-sectional view taken along the line C-C' in (A), and (C) is a portion of the enlarged view of the inductor core illustrated in (A).

FIG. 4 illustrates an embodiment of an electronic pen according to the present disclosure. FIG. 4(A) is a cross-sectional view taken along the direction of the central axis. FIG. 4(B) is a cross-sectional view taken along the line C-C' in FIG. 4(A). FIG. 4(C) is a portion of the enlarged view of the inductor core illustrated in FIG. 4(A). The electronic pen illustrated in FIG. 4 is a mechanical pencil 50 that houses a core (not illustrated) having a diameter that falls within a range of, for example, from 0.2 mm to 2 mm, in which the core is pushed out to perform writing.

A housing 52 made of synthetic resin is formed into a substantially cylindrical shape by injection molding. A first tubular body 53 disposed at the front tip side and a second tubular body 54 disposed at a rear end side are connected via a shaft joint 55. The tip portion of the first tubular body 53 includes a tapered portion 53a having an outer diameter gradually decreasing toward the tip end. The tip end of the tapered portion 53a is provided with an opening portion 53b from which a writing tip 57 of a mechanical pencil unit 56 that will be described later protrudes.

As illustrated in FIG. 4(B), the second tubular body 54 includes a rearward separation wall 54a orthogonal to the central axis at a middle point in the direction of the central axis. The rearward separation wall 54a includes a pair of leg-portion through holes 54b each having a circular arc shape. The leg-portion through holes 54b are provided across the central axis. The leg-portion through hole 54b is a hole configured to receive insertion of a leg portion 58a of an eraser-receiving base 58 that will be described later.

The eraser-receiving base 58, which is a portion of the knock mechanism of the mechanical pencil 50, is inserted into a rear internal space of the rearward separation wall 54a of the second tubular body 54. A knock spring 59 is inserted into an internal space at the front tip side of the eraser-receiving base 58. The tip end of the knock spring 59 is in contact with the surface of the rearward separation wall 54a at the rear end side. The rear end portion of the eraser-receiving base 58 protrudes from the rear end edge of the second tubular body 54, and has a rear end edge provided with a recessed portion where an eraser 60 is mounted.

The eraser 60 together with a portion of the eraser-receiving base 58 that protrudes from the rear end edge of the second tubular body 54 is covered with an eraser cover 61 having a front tip side being opened and having a cylindrical shape. As described later, the eraser cover 61 also functions as a knock button for the mechanical pencil 56. In addition, a pair of leg portions 58a protrude from the tip end of the eraser-receiving base 58. The leg portions 58a extend through the rearward separation wall 54a in a freely slidable manner in a rear-tip direction in association with a knock operation for pressing the eraser cover 61.

A pressure sensing sensor 63 is fixed at a surface of the rearward separation wall 54a of the second tubular body 54 at the front tip side. A refill joint 64 is provided so as to surround this pressure sensing sensor 63. This refill joint 64 is connected to the leg portion 58a that extends through the rearward separation wall 54a, and is configured to be able to move in a rear-tip direction within the second tubular body 54 in association with the knock operation of the eraser cover 61.

A pressure sensing sensor spring 65 is interposed between the refill joint 64 and the surface of the rearward separation wall 54a at the front tip side. In a state where neither knock operation nor writing is performed, the refill joint 64 and the pressure sensing sensor 63 are not in contact with each other, and the core is not in a state of protruding from the writing tip 57. A rear end of a core case pipe 66 of the mechanical pencil unit 56 serving as a writing unit is inserted into and fixed at the refill joint 64. With this configuration, the core case pipe 66 moves in a rear-tip direction in association with movement of the refill joint 64 in the rear-tip direction.

A frontward separation wall 55A orthogonal to the axial direction is formed at or around the tip end of the interior of the shaft joint 55. A unit through hole 55b is formed in this frontward separation wall 55a, and the core case pipe 66 penetrates through the unit through hole 55b. A writing tip 69 serving as a tip portion of an interior mechanism 67 connected to the tip end of the core case pipe 66 protrudes from the opening portion 53b.

A core mounting hole 55c where a rear end of the inductor core 1 is mounted is formed in a surface of the frontward separation wall 55a at the front tip side. The inductor core 1 has a pillar shape, and the coil 21 is wound around the periphery of the straight body portion of the cylindrical column body. The inductor core 1 is disposed alongside the mechanical pencil unit 56, and the tip end thereof reaches the tapered portion 53a. In addition, a capacitor 70 is housed in the internal space of the shaft joint 55 at the rearward side. The coil 21, the capacitor 70, and the pressure sensing sensor 63 form a circuit through wiring (not illustrated).

Figure 5:
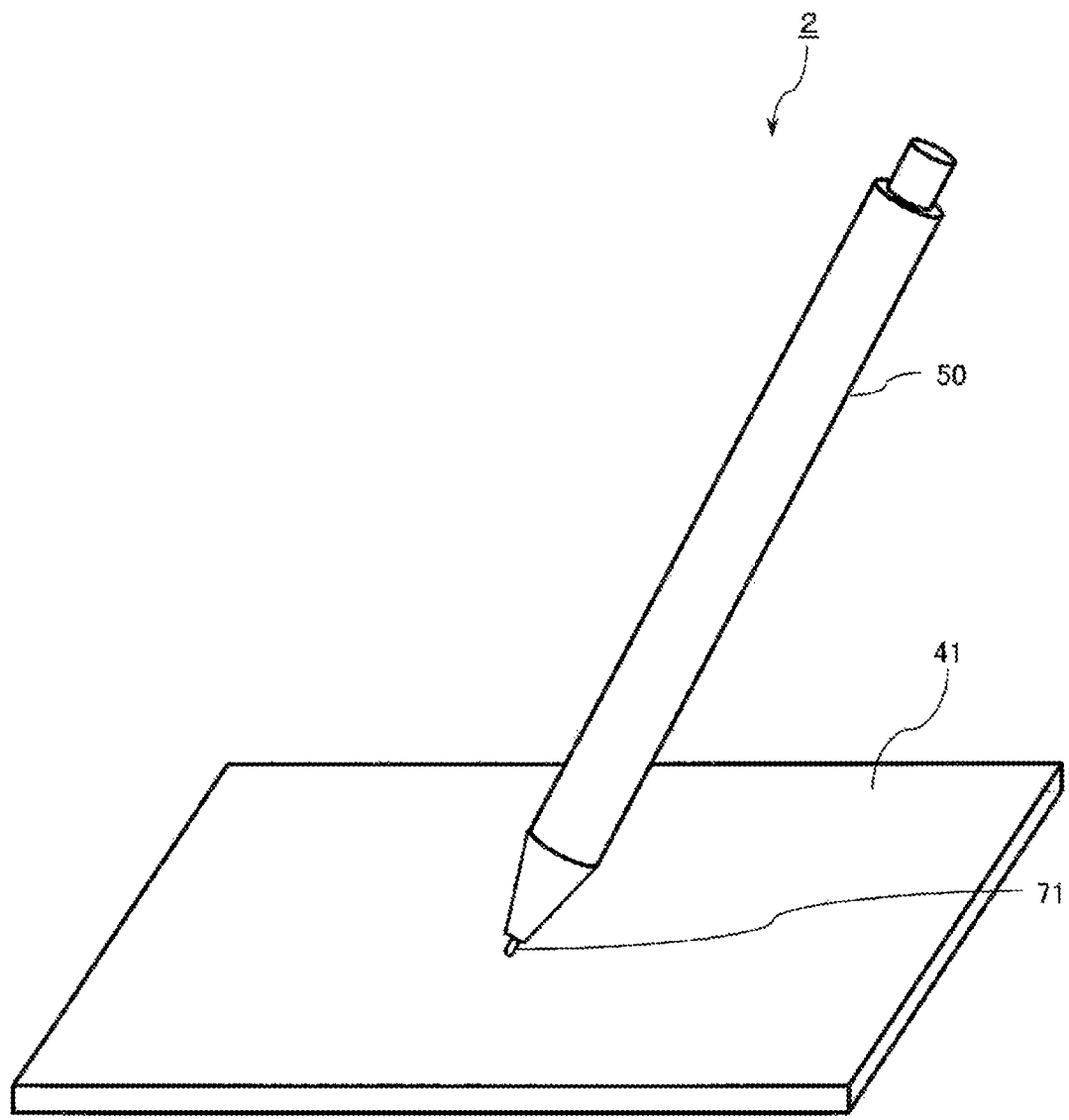
FIG. 5 is a perspective view illustrating an embodiment of an input device according to the present disclosure.

FIG. 5 is a perspective view illustrating an input device according to the present embodiment. An input device 2 includes an electronic pen 50 and a tablet 41 serving as a position detection device including a sensor (not illustrated) configured to detect a position. The input device 2 can detect a position where a tip portion of the core body 71 comes into contact with the tablet 41. In addition to the tablet 41 the position detection device may be a mobile terminal or the like including a touch panel display. An electromagnetic induction method can be used as the method of detecting positions at the input device 2. Such an input device 4 includes the electronic pen 3 containing the inductor core 1 in which the coil 21 is less likely to be damaged. This makes it possible to achieve the input device 2 having high reliability.

The embodiments have been described in detail above. However, the present invention is not limited to the embodiments described above, and various modifications or improvements or the like can be made without departing from the main gist of the present invention.

REFERENCE SIGNS LIST

1 Inductor core
2 Input device
10 Magnetic main body
10a One end
10b Other end
11 Inclined portion
11a Inclined surface
11b End surface
12 Straight body portion
12a, 12b, 12c Outer peripheral surface
13 Flange portion
13a Outer peripheral surface
50 Electron pen (mechanical pencil)

The invention claimed is:
1. An inductor core comprising:
a magnetic main body having a pillar shape and comprised of a magnetic material, wherein
the magnetic main body includes:
an inclined portion including an inclined surface that constitutes an outer circumferential surface of a truncated cone having an outer diameter increasing from one end of the magnetic main body toward the other end; and
a straight body portion that is coaxial with the inclined portion and includes an outer peripheral surface that constitutes an outer circumferential surface of a cylindrical column body extending from the other end toward the one end, the straight body portion being connected to the inclined portion, and
an arithmetic mean roughness Ra of an outer peripheral surface of the straight body portion located at or around the other end is smaller than an arithmetic mean roughness Ra of an outer peripheral surface of the straight body portion located at or around the inclined portion.

2. The inductor core according to claim 1, wherein
the arithmetic mean roughness Ra of the outer peripheral surface of the straight body portion located at or around the inclined portion is equal to or less than 6 µm.

3. The inductor core according to claim 1, wherein
a root mean square roughness Rq of the outer peripheral surface of the straight body portion located at or around the other end is smaller than a root mean square roughness Rq of the outer peripheral surface of the straight body portion located at or around the inclined portion.

4. The inductor core according to claim 3, wherein
the root mean square roughness Rq of the outer peripheral surface of the straight body portion located at or around the inclined portion is not more than 10 µm.

5. The inductor core according to claim 1, wherein
the magnetic main body is made out of ceramic containing, as a main constituent, ferrite comprised of an oxide of Fe, Zn, Ni, and Cu, and
a coefficient of variation CV of an average crystal grain size of the ceramic expressed as Equation (1) stated below is not less than 0.08 and not more than 0.3, $$CV = \sigma/x \tag{1}$$

where x is an average value of the average crystal grain size of the ceramic, and σ is a standard deviation of the average crystal grain size of the ceramic.

6. The inductor core according to claim 5, wherein
a kurtosis Ku of the average crystal grain size is equal to or more than 0.

7. The inductor core according to claim 5, wherein
a skewness Sk of the average crystal grain size is equal to or more than 0.

8. The inductor core according to claim 5, wherein
a composition in 100 mol % obtained by adding up the main constituents includes Fe of not less than 49 mol % and not more than 50 mol % on a $Fe_2O_3$ basis, Zn of not less than 29 mol % and not more than 34 mol % on a ZnO basis, Ni of not less than 10 mol % and not more than 12.5 mol % on a NiO basis, and Cu of not less than 4 mol % and not more than 9 mol % on a CuO basis.

9. The inductor core according to claim 8, comprising
at least any of an oxide of Mo and an oxide of Bi, wherein
a content of the oxide of Mo with respect to 100 parts by mass of the main constituent is not less than 0.01 parts by mass and not more than 0.2 parts by mass on a $MoO_3$ basis, or
a content of the oxide of Bi with respect to 100 parts by mass of the main constituent is not less than 0.01 parts by mass and not more than 0.2 parts by mass on a $Bi_2O_3$ basis.

10. The inductor core according to claim 8, comprising
at least any of an oxide of Mn and an oxide of Ti, wherein
a content of the oxide of Mn with respect to 100 parts by mass of the main constituent is not less than 0.01 parts by mass and not more than 0.3 parts by mass on a $MnO_2$ basis, or
a content of the oxide of Ti with respect to 100 parts by mass of the main constituent is not less than 0.01 parts by mass and not more than 0.2 parts by mass on a $TiO_2$ basis.

11. The inductor core according to claim 8, comprising
an oxide of Zr, wherein
a content of the oxide of Zr with respect to 100 parts by mass of the main constituent is not less than 0.01 parts by mass and not more than 0.2 parts by mass on a $ZrO_2$ basis.

12. The inductor core according to claim 8, comprising
an oxide of Cr, wherein
a content of the oxide of Cr with respect to 100 parts by mass of the main constituent is not less than 0.02 parts by mass and not more than 0.3 parts by mass on a $Cr_2O_3$ basis.

13. The inductor core according to claim 8, wherein
at least the inclined portion contains Mo, and
a grain boundary layer interposed between the ferrite crystals adjacent to each other contains more Mo than that contained in grains of a ferrite crystal.

14. The inductor core according to claim 8, wherein
in at least a portion of a ferrite crystal, a content of Fe at a center portion of the ferrite crystal is greater than a content of Fe at an outer edge portion of the ferrite crystal.

15. The inductor core according to claim 14, wherein
a difference between the content of Fe at the center portion and the content of Fe at the outer edge portion is not less than 1.3 mass % and not more than 4.0 mass %.

16. The inductor core according to claim 8, wherein
$I_2/I_1$ is not less than 0.29 and not more than 0.38, where $I_1$ is an X-ray diffraction peak intensity at a diffraction angle (2θ) falling within a range of not less than 35° and not more than 36° and obtained through X-ray diffraction using a Cu-Kα line, and $I_2$ is an X-ray diffraction peak intensity at a diffraction angle (2θ) falling within a range of not less than 29.5° and not more than 30.5°.

17. The inductor core according to claim 16, wherein
a half width of the X-ray diffraction peak intensity $I_1$ is not less than 0.05 and not more than 0.35.

18. The inductor core according to claim 16, wherein
$I_3/I_1$ is equal to or less than 0.14, where $I_3$ is an X-ray diffraction peak intensity at a diffraction angle (2θ) falling within a range of not less than 42° and not more than 43°.

19. An electronic pen comprising:
a housing including an opening;
a writing unit that can be used to write on a target writing surface; and
the inductor core according to claim 1, wherein
the writing unit is disposed along a central axis of the housing, and
the inductor core is disposed alongside the writing unit within the housing.

20. An input device comprising:
the electronic pen according to claim 19; and
a position detection device including a sensor configured to detect a position at which the electronic pen approaches.

* * * * *